United States Patent

[11] 3,555,296

| [72] | Inventor | Allan L. Flanagan |
| | | Attleboro, Mass. |
| [21] | Appl. No. | 739,243 |
| [22] | Filed | June 24, 1968 |
| [45] | Patented | Jan. 12, 1971 |
| [73] | Assignee | The Foxboro Company |
| | | Foxboro, Mass. |

[54] INDUSTRIAL PROCESS INSTRUMENT FOR PRODUCING LINEARLY-VARYING CONTROL SIGNALS
9 Claims, 2 Drawing Figs.

[52] U.S. Cl. ................................................. 307/228,
307/293; 328/1, 328/181; 330/9; 328/127
[51] Int. Cl. ......................................................... H03k 3/00
[50] Field of Search............................................ 328/181,
184, 185, 127, 1; 307/228, 293, 264; 235/151.12;
330/9, 1A

[56] References Cited
UNITED STATES PATENTS

| 3,184,686 | 5/1965 | Stanton ........................ | 328/127 |
| 3,311,834 | 3/1967 | Barker.......................... | 328/181 |

*Primary Examiner*—Donald D. Forrer
*Assistant Examiner*—B. P. Davis
*Attorney*—Bryan, Parmelee, Johnson & Bollinger

ABSTRACT: An electronic signal-controlling apparatus adapted to produce output signals of a predetermined time-varying nature, for example linearly-varying output signals, sometimes referred to in the art as ramp signals.

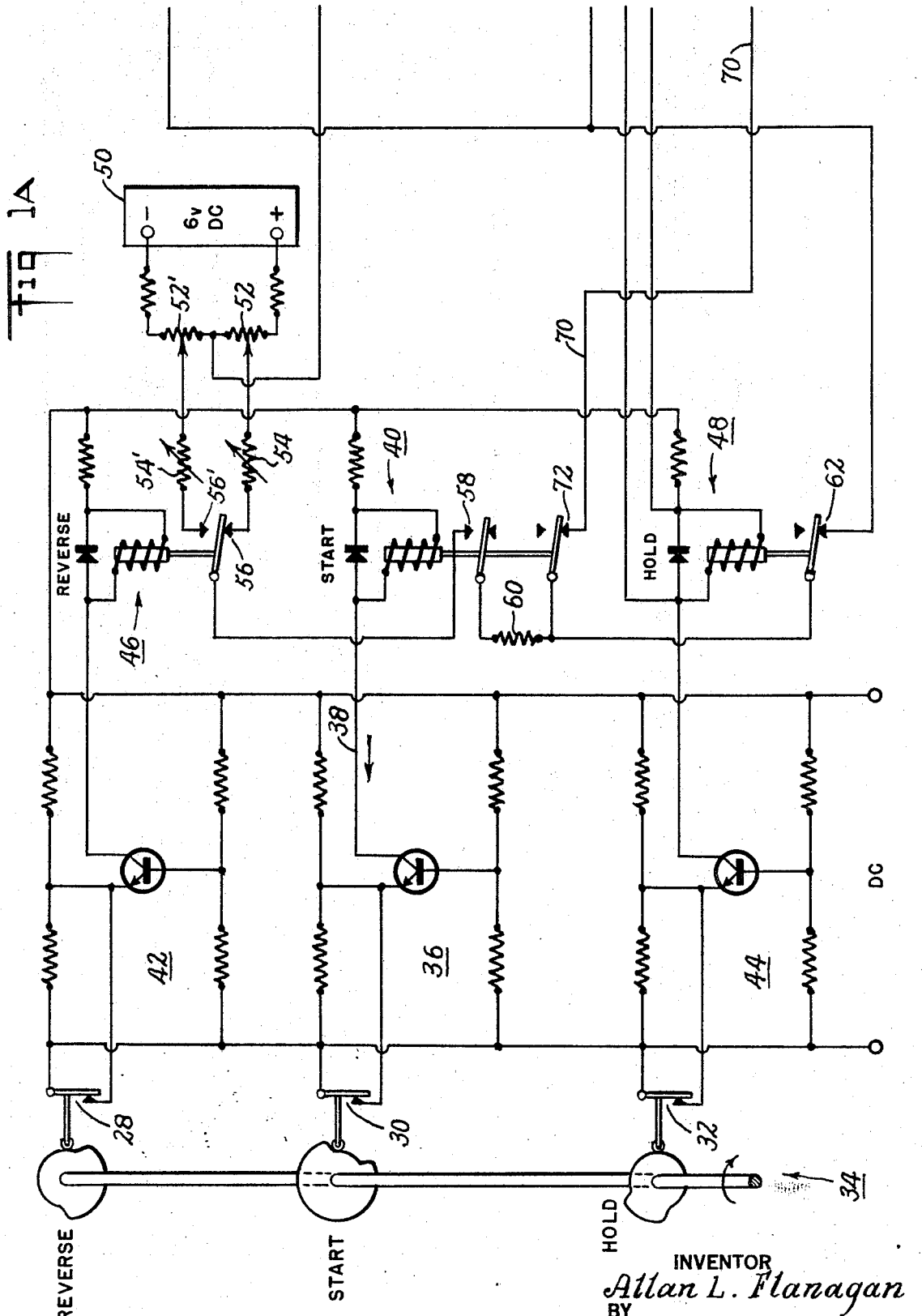

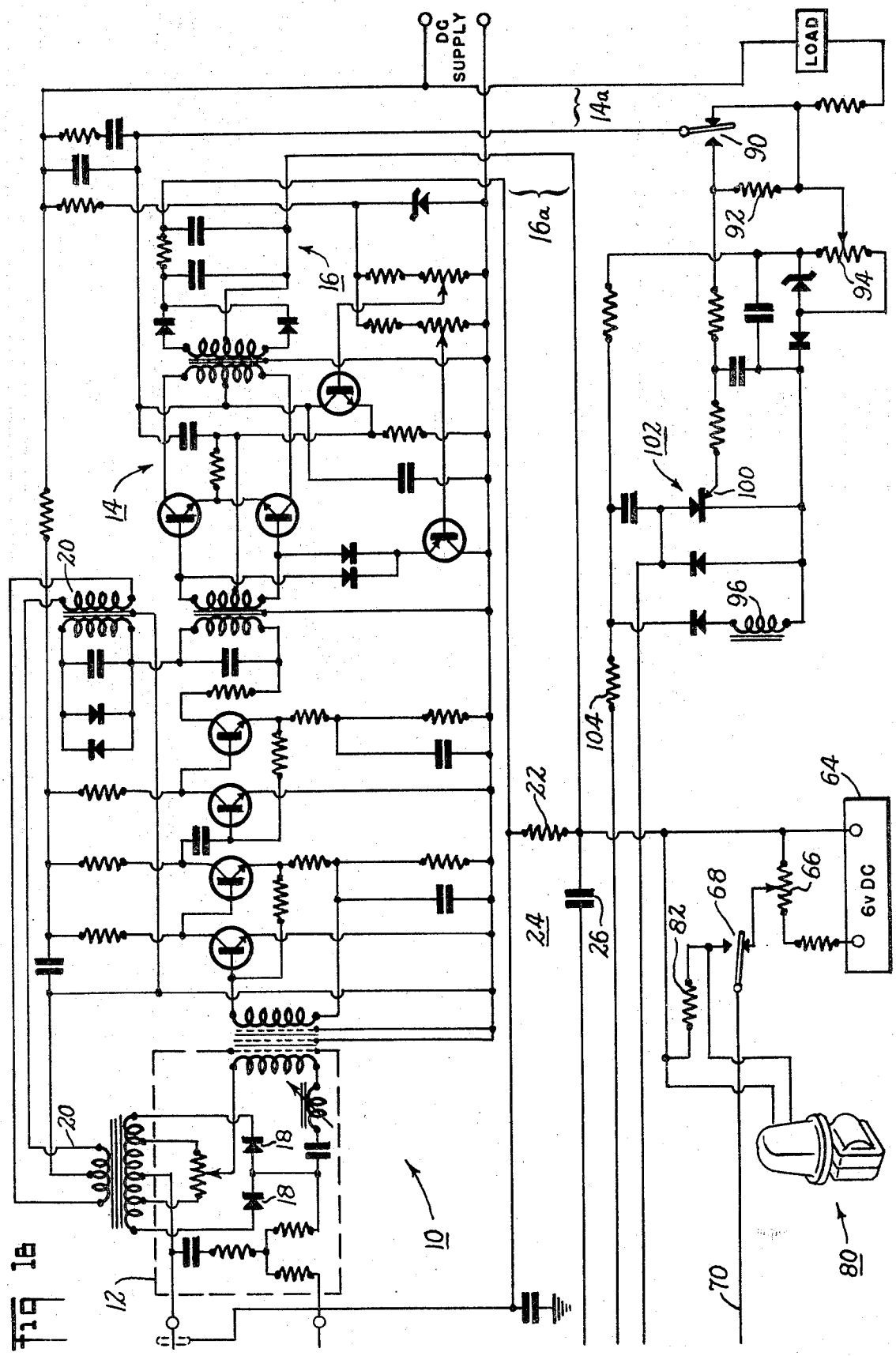

INDUSTRIAL PROCESS INSTRUMENT FOR PRODUCING LINEARLY-VARYING CONTROL SIGNALS

This invention relates to industrial process instrumentation apparatus. More particularly, this invention relates to electronic signal controlling apparatus adapted to produce output signals of predetermined time-varying nature, for example linearly-varying output signals, sometimes referred to in the art as "ramp" signals.

Such ramp signals typically might be used as control signals for valve operators in a gas pipeline flow control system wherein so-called auto-selector controllers are employed at each pumping station to maintain the pumping rate at a proper level. The individual pumping stations must at times be started up and shut down for various purposes. During a startup sequence, it is desirable for the valve to open slowly and at a constant rate until a predetermined point is reached at which the auto-selector control system can take over smoothly; during shutdown, it similarly is desirable to have the valve close slowly at a constant rate. A ramp signal thus may be used with advantage in providing the valve signal for effecting such slow and constant-rate valve operation.

Ramp signals also find use in control systems for batch processes. For example, a ramp signal may be used as the set-point signal for a conventional analogue controller, and may be programmed to vary through a specific sequence of changes, e.g. to provide a positive (up) ramp for a predetermined initial period, a constant unchanging signal for an intermediate period, and a negative (down) ramp for a final period. In certain special applications, it is necessary to start the setpoint ramp variation at a level corresponding to the value of a particular process condition, and for such applications the ramp function generator advantageously is provided with means to cause the output signal to "follow" the condition measurement until the time is reached when the ramp generator output is to take over control of the set point to vary it in the programmed ramp fashion.

Accordingly, it is an object of the present invention to provide a specialized function generator capable of producing an output signal which varies linearly with time at a predetermined but adjustable rate. It is a specific object of this invention to provide such apparatus to be used with a variety of different types of process instrumentation systems. Other objects, aspects, and advantages of the present invention will in part be pointed out in, and in part apparent from, the following description considered together with the accompanying drawing of which FIG. 1A and FIG. 1B present a schematic diagram of a preferred embodiment of the invention.

Referring now to the drawing, the ramp signal generating apparatus includes a high-gain amplifier 10 having an input circuit 12 and two separate output circuits 14 and 16. An amplifier of this general character is disclosed in copending application Ser. No. 507,765, filed by D. A. Richardson, et al. on Nov. 15, 1965, and accordingly detailed description of the features common to that amplifier will be omitted from this application. This amplifier comprises a very high impedance input circuit, i.e., of the order of thousands of megohms, so that the amplifier does not require any significant input current for its operation.

To provide this high impedance, the input circuit 12 includes a pair of "capacity diodes" 18 presenting an electrical capacity which is a function of a the applied DC input voltage. The DC resistance of the diodes is extremely high, so that essentially no current is drawn by the input circuit. The capacity of the diodes 18 controls a bridge arrangement serving as a variable-coupling network for coupling the input to a positive feedback circuit 20. This feedback circuit causes oscillations with an amplitude corresponding to the magnitude of the DC input signal.

The output circuits 14 and 16 are transformer coupled to the oscillating circuit of the amplifier 10, and thus are conductively isolated from the input circuit 12, as well as from each other. These output circuits include rectifying means to develop DC current output signals proportional to the amplitude of oscillation produced by the positive feedback circuit 20. Thus the output currents are proportional to the DC signal applied to the input circuit.

The principal output circuit 14 furnishes to the load circuit 14a/a current in the range of 10 to 50 milliamps over the full scale input voltage variation of approximately 1 millivolt. The secondary output circuit 16 provides through leads 16a/a corresponding current in the range of 5 to 25 milliamps to a 200 ohm resistor 22 for developing proportional negative feedback voltage. This feedback voltage is directed through a feedback circuit 24 including a large series capacitor 26 (2 microfarads), to apply to the input circuit 12 a voltage opposing changes in the applied input signal. Thus this feedback circuit acts to hold the actual amplifier input voltage substantially at zero.

As shown at the left-hand edge of FIG. 1A, the particular ramp function generator disclosed herein is operable remotely be by means of three switches 28, 30 and 32, referred to herein as the "reverse" switch, "start" switch, and "hold" switch respectively. These switches may for example be actuated by a sequencing device which is illustrated schematically by a simple cam mechanism 34. It will be evident, however, that such a sequencing function might normally be performed by other equivalent means such as electronic means.

The sequencing device 34 may first actuate the start switch 30, by mechanically opening its contacts, thereby removing a short circuit from across a resistor-forming part of a transistor relay driver circuit 36. When this resistor is unshorted, the relay driver circuit operates in known fashion to produce a DC output current which is directed through lead 38 to a "start" relay 40. The reverse and hold switches 28 and 32 similarly control relay driver circuits 42 and 44 arranged to actuate corresponding "reverse" and "hold" relays 46 and 48.

When the starter relay 40 pulls in, it closes a circuit to apply a small predetermined DC current to the input circuit 12 of the amplifier 10. This circuit may be traced from a DC power supply 50, through a calibrating potentiometer 52, a large rate-adjusting resistor 54 (100 megohms), contacts 56 of the reverse relay 46, contacts 58 of the start relay 40, a relatively small (820k) resistor 60, contacts 62 of the hold relay 48, and thence to the amplifier input circuit 12. Completion this circuit produces a small flow of current into the input of the amplifier 10, in an amount proportional to the voltage picked off by the potentiometer 52 and to the setting of the rate-adjusting resistor 54.

The voltage of the power supply 50 is very closely controlled by means of suitable regulating devices such as a zener diode. The DC voltage produced by this power supply may, for example, be about 6 volts, and the portion of that voltage picked off by the calibrating potentiometer 52 may be of the order of 200 millivolts. The adjustable resistor 54 is the principal means for setting the magnitude of the current flow into the amplifier 10, while the potentiometer 52 provides a calibration adjustment.

The negative feedback circuit 24, operates, during the time current flows into the input circuit 12, to prevent any effective change in the net input voltage between the terminals of the input circuit. In effect, the current flowing into the input circuit from the power supply 50 is matched by an opposite current flow into the feedback capacitor 26. Consequently, this capacitor charges (or discharges) at a substantially constant rate predetermined by the voltage of the power supply 50 and the resistance of the rate-adjusting resistor 54. It will be evident, therefore, that the output current of the amplifier 10 similarly will change at a constant rate, i.e., linearly with respect to time.

In a practical embodiment of the invention, with the rate-adjusting resistor 54 set at its maximum value of 100 megohms, the time required for the amplifier output to change full scale (i.e. from 10 to 50 milliamps) was approximately 60 minutes, and with excellent linearity over this entire variation. Thus it will be apparent that the disclosed arrangement has the capability of providing desirably slow signal variations with precision adequate for difficult process control problems. With the rate-adjusting resistor set for its minimum value (zero), the rate of change of the amplifier output signal is determined by the ohmic resistance of the small resistor 60, and this is arbitrarily set to provide a minimum full-scale ramp time of one-half minute.

The level of the output current at the start of the ramp function will be determined by the charge on the feedback capacitor 26 at the time the start relay 40 is actuated. Before actuation of this relay, the magnitude of the capacitor charge is controlled by a steady DC signal applied to the amplifier input from a second DC voltage supply means 64. The output of this voltage supply means can be varied by a potentiometer 66 for setting the start levels of the positive or negative ramp signals.

The DC potential derived from potentiometer 66 is directed through a control lead 70, contacts 72 of the start relay 40, and contacts 62 of the hold relay 48 to the input circuit 12 of the amplifier. This circuit provides a connection path of essentially zero resistance, so that the charge on the feedback capacitor 26 will always correspond directly to the value of the applied voltage, i.e. there will be no time-varying effects unless the applied voltage itself is varied. Thus, the potential produced by voltage supply means 64 provides a clamping action to hold the amplifier output fixed at the value determined by the selected setting of the adjustment potentiometer 66.

When the sequencing device 34 reaches the second, or intermediate phase of its operation, it will open the hold switch 32, and the corresponding hold relay 48 will be pulled in to open relay contacts 62 and disconnect the control signal from the input circuit 12 of the amplifier. Accordingly, since current flow into the amplifier input is instantly ceases, the amplifier output will no longer vary, and will remain fixed at the level existing at the moment the hold relay was actuated. This constant output condition will be maintained with very low drift and high stability, in part because of the extremely high DC impedance presented by the input circuit 12. That is, very little current can flow in the circuit connected to capacitor 26 while the input circuit 12 is open, and therefore the charge on the capacitor will remain fixed in magnitude, except for changes due to internal capacitor leakage. By using a high quality capacitor, this leadage can be made extremely low, and thus the amplifier output will be held substantially constant over relatively long periods of time.

In the final phase of its operation, the sequencing device 34 opens the reverse switch 28, thereby actuating the reverse relay 46 to its opposite position. Immediately thereafter, the sequencing device recloses the hold switch 32 so as to deactuate the hold relay and reengage the hold relay contacts 62. With the reverse relay 46 in its opposite position, closure of relay contacts 62 causes the amplifier to receive a negative input signal, that is, a signal of polarity opposite to the that which had been applied in the initial phase of operations. The circuit for applying this opposite polarity signal may be traced from the DC voltage supply 50, a calibrating potentiometer 52', through a second relatively large variable rate-adjusting resistor 54' (100 megohms), reverse relay contacts 56', and thence to the input circuit 12 along the same circuit path described hereinabove for the positive input signal.

With a negative signal thus applied to the amplifier input circuit, the amplifier output current will decrease at a rate determined primarily by the value selected for the adjustable resistor 54', and secondarily by the magnitude of the voltage picked off by potentiometer 52'. This decrease in output current will be at a substantially constant rate, because as previously explained the negative feedback action holds the net voltage across the input terminals substantially at zero, and the current flow into the capacitor therefor will be essentially constant. Thus in this phase of operation, the amplifier output represent a linearly-changing "down" ramp function which, as in the case of the initial "up" ramp function, can be adjusted for a maximum ramp time of about 60 minutes with the resistor 54' set at 100 megohms.

In some circumstances, it is necessary to provide a linearly-varying ramp signal which starts at a level determined by the measurement of a particular process condition. Such arrangement is illustrated in the drawing by a circuit including a remote measuring instrument 80 which may, for example, comprise a differential pressure cell a temperature-measuring device or the like. In the disclosed embodiment, this measuring instrument produces an output current, in the range of 10 to 50 milliamps, which is directed through a resistor 82 to produce a corresponding voltage signal indicating by its value the magnitude of the measured process condition.

Measurement voltage across resistor 82 is directed through jumper 68 to control lead 70 connected to the start relay 40. Thus, prior to initiation of ramp action, i.e., while the start relay is deactuated, the condition-responsive measurement voltage is applied directly to the input circuit 12 of the amplifier. As explained hereinabove, since the path through lead 70 to the amplifier input has a very low (essentially zero) resistance, the charge on capacitor 26 will follow the changes in applied voltage without any delaying action. Thus the current produced in the amplifier output circuit 14 will be maintained at a level directly corresponding to the measurement voltage produced at resistor 82, and will continuously follow variations in that measurement voltage due to changes in the process condition. To initiate the ramp action, the start relay 40 is actuated, and the ramp output will begin at a level corresponding to the measured process condition at the instant of switchover.

In certain special applications, it has been found desirable to automatically terminate ramp action when the output signal reaches a predetermined level. This feature is provided, in accordance with another aspect of the present invention, through circuit means brought into play by a switch 90 in the amplifier output circuit. Operating this switch deflects the output current thru through a series resistor 92 to develop a control voltage corresponding to the output current, i.e. having a ramp characteristic as described hereinabove. The control circuitry described herein is arranged for operation with negative (down) ramps, but it will be understood that the polarities can readily be reversed for up ramps.

The control voltage across resistor 92 is connected in series-opposition to a set-point voltage developed by a potentiometer 94 supplied with direct current from a regulated power supply energized by the secondary winding 96 of a power transformer. When the control voltage across resistor 92 decreases beyond the level of the preset set-point voltage from potentiometer 94, a positive signal is applied to the control electrode 100 of an SCS switch 102. This switch thus is turned on to permit a flow of current from the transformer winding 96 thru through a resistor 104 to the actuating coil of the hold relay 48. This relay thereupon pulls in and the output of the amplifier 10 is immediately arrested, to be held fixed at that level until the next phase in the program of operation is reached.

Although a specific preferred embodiment of the invention has been described hereinabove, it is desired to emphasize that this is intended only to illustrate the invention, and is not necessarily in limitation thereof, it being understood that modifications of the invention can be devised by those skilled in the art to suit various applications.

I claim:

1. Industrial process signal-controlling apparatus for generating specialized signal functions and comprising a high-gain amplifier having a high-impedance input circuit and at least one output circuit adapted to produce an output signal corresponding to the amplifier input signal; a negative feedback circuit connected between said output and input circuits to tend to hold the amplifier input at zero; a series capacitor for said feedback circuit to provide linear integrating actions; first voltage supply means for producing two small DC voltages of opposite polarity; reversing switch means coupled to said first voltage supply means to make selective connection one or the other of said DC voltages; impedance means including at least one adjustable resistor of high ohmic resistance; start switch means having "on" and "off" conditions and adapted when actuated to said "on" conditions to complete a connection coupling the small DC voltage selected by said reversing switch means through said adjustable resistor to said amplifier input to produce an amplifier output signal which changes linearly in ramp fashion at a rate determined by the values of said DC voltage and said adjustable resistor, and in a direction determined by the polarity of the selected DC voltage; second voltage supply means arranged to produce a small DC potential; means to adjust the magnitude of said DC potential; circuit means providing a low-impedance path; and control switch means operable to complete a connection coupling said small DC potential through said low-impedance path to said amplifier input circuit in place of said DC voltage, charging said capacitor without delay to a level corresponding to said small DC potential and maintaining it at any level to which the DC potential has been adjusted, thereby to fix the amplifier output signal at a value corresponding directly to said small off" potential during during periods intervening the generation of linearly-changing ramp output signals.

2. Apparatus as claimed in claim 1, wherein said control switch means forms parts of said start switch means and is operable to connect to said DC potential directly to the amplifier input when said start switch means is shifted to "off" condition.

3. Apparatus as claimed in claim 1, including first and second adjustment means for altering said DC voltages to set a desired calibration for the instrument.

4. Apparatus as claimed in claim 1, wherein said impedance means comprises a pair of adjustable resistors of high ohmic resistance, said reversing switch means being arranged to select one of said resistors corresponding to the selected DC voltage, whereby the ramp rate in up and down directions can be independently controlled.

5. Industrial process signal-controlling apparatus comprising a high-gain amplifier having a high-impedance input circuit and at least one output circuit adapted to produce an output signal corresponding to the amplifier input signal; a negative feedback circuit connnected between said output and input circuits to tend to hold the amplifier input signal at zero; a series capacitor for said feedback circuit to provide linear integrating action; first adjustable voltage-supply means for producing a small DC voltage; first circuit means including an adjustable resistor of high ohmic resistance; start switch means having "on" and "off" conditions and adapted when actuated to said "on" condition to complete a connection coupling said small DC voltage through said adjustable resistor to said amplifier input to produce an amplifier output signal which changes linearly in ramp fashion at a rate determined by the values of said DC voltage and said adjustable resistor; control input means arranged to receive a variable signal from a remote unit such as a condition-measuring device and to develop a corresponding variable DC potential; second circuit means providing a low-impedance path; and control switch means operable to complete a connection coupling said variable DC potential through said low-impedance path to said amplifier input circuit in place of said DC voltage so as to charge said capacitor without delay to a level corresponding to said DC potential and to cause the capacitor charge to follow continuously changes in the value of said DC potential, whereby the amplifier output signal will follow closely the magnitude of said small DC potential during periods of time preceding or intervening the generation of a linearly-changing ramp-like output signal.

6. Apparatus as claimed in claim 5, wherein said control input means comprises a fixed resistor of low ohmic resistance to receive a current signal and to or produce a corresponding voltage signal for application to said amplifier input.

7. Industrial process signal-controlling apparatus for generating specialized signal functions and comprising a high-gain amplifier having a high-impedance input circuit in and at least one output circuit adapted to produce an output signal corresponding to the amplifier input signal; a negative feedback circuit connected between said output and input circuits to tend to hold the amplifier input at zero; a series capacitor for said feedback circuit to provide linear integrating action; first voltage supply means arranged to produce small DC potential; means to adjust the magnitude of said DC potential; circuit means providing a low-impedance path; start switch means having "off" and "on" conditions and arranged when in "off" condition to complete a circuit connecting said small DC potential through said low-impedance path to said amplifier input, thereby to hold the charge on said capacitor at a level corresponding to said DC potential and to maintain the amplifier output at a corresponding value; second voltage supply means for producing two small DC voltages of opposite polarity; reversing switch means coupled to said second voltage supply means to make selective connection to one or the other of said DC voltages; impedance means including at least one adjustable resistor of high ohmic resistance; said start switch means being arranged when actuated to said "on" condition to complete a connection coupling the small DC voltage selected by said reversing switch means through said adjustable resistor to said amplifier input in place of said DC potential, thereby to produce an amplifier output signal which changes linearly in ramp fashion at a rate determined by the values of said DC voltage and said adjustable resistor, and in a direction determined by the polarity of the selected DC voltage.

8. Apparatus as claimed in claim 7, including a hold switch with switch on contacts connected to said amplifier input and operable when actuated to isolate said input from the DC voltage applied thereto for generating a ramp function, whereby when said hold switch is operated, the amplifier output will be maintained at the level existing at that time.

9. Apparatus as a claimed in claim 8, including relay means for operating said hold switch; means responsive to the output of said amplifier to produce a control signal; set-point means for producing an adjustable set signal opposing said control signal and relay-actuating means coupled to said set-point means to actuate said hold relay when the amplifier output reaches the selected set point.